(12) United States Patent
Hiraguchi et al.

(10) Patent No.: US 7,398,940 B2
(45) Date of Patent: Jul. 15, 2008

(54) LEADER TAPE, METHOD FOR MANUFACTURING THE SAME, AND MAGNETIC TAPE CARTRIDGE

(75) Inventors: Kazuo Hiraguchi, Kanagawa (JP); Shozo Onmori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 372 days.

(21) Appl. No.: 11/154,592

(22) Filed: Jun. 17, 2005

(65) Prior Publication Data

US 2006/0032959 A1 Feb. 16, 2006

(30) Foreign Application Priority Data

Jun. 17, 2004 (JP) ............... 2004-180083

(51) Int. Cl.
*G11B 15/66* (2006.01)
(52) U.S. Cl. ............... 242/332.4; 242/348; 360/132
(58) Field of Classification Search ............... 242/348, 242/348.2, 332.1, 332.4, 532.3; 360/132, 360/134
See application file for complete search history.

(56) References Cited

U.S. PATENT DOCUMENTS

| 5,845,860 A | 12/1998 | Tohjo et al. |
| 6,568,617 B1 | 5/2003 | Rambosek |
| 7,086,623 B2 * | 8/2006 | Sato et al. ............... 242/348.2 |
| 2002/0109027 A1 | 8/2002 | Ishihara et al. |
| 2003/0062437 A1 | 4/2003 | Tatsumi et al. |
| 2003/0189119 A1 | 10/2003 | Morita et al. |
| 2004/0033453 A1 * | 2/2004 | Kobayashi |
| 2004/0159733 A1 * | 8/2004 | Sato et al. ............... 242/348 |
| 2005/0214595 A1 * | 9/2005 | Hayakawa |

FOREIGN PATENT DOCUMENTS

| EP | 1204114 A1 | 5/2002 |
| JP | 54-77911 A | 6/1979 |
| JP | 62-15945 B2 | 4/1987 |
| JP | 5-314452 A | 11/1993 |
| JP | 9-204755 A | 8/1997 |
| JP | 2000-11591 A | 1/2000 |
| JP | 2005-285261 | * 10/2005 |

* cited by examiner

*Primary Examiner*—William A Rivera
(74) *Attorney, Agent, or Firm*—Sughrue Mion, PLLC.

(57) ABSTRACT

The present invention provides a leader tape, method for manufacturing the same, and a magnetic tape cartridge with a leader tape having surface properties and conductive properties for securing slide durability suitable for a magnetic tape drive using a magnetic tape cartridge of one reel cartridge. A leader tape joined to a starting end of a magnetic tape wound around a magnetic tape reel of a one reel cartridge, comprising: a base material; and a conductive slide layer formed on at least one surface of the base material, the surface of the conductive slide layer having a surface electrical resistance value of $10^2$ Ω/square to $10^{10}$ Ω/square and a surface roughness Ra of 0.5 μm to 1.5 μm.

19 Claims, 4 Drawing Sheets

CONDUCTIVE SLIDE LAYER

LEADER TAPE, METHOD FOR MANUFACTURING THE SAME, AND MAGNETIC TAPE CARTRIDGE

BACKGROUND OF THE INVENTION

1. Field of the Invention

The present invention relates to a leader tape having surface properties and conductive properties for securing slide durability suitable for a magnetic tape drive for driving one reel cartridge, and a method for manufacturing the same.

2. Description of the Related Art

A magnetic tape cartridge constituted by rotatably storing a single reel on which a magnetic tape is wound in a cartridge case consisting of an upper cartridge and a lower cartridge as an external recording medium for data backup of a computer or the like, that is, one reel type magnetic tape cartridge has been known. When the one reel type magnetic tape cartridge is not used, the magnetic tape is completely involved in the reel. When the one reel type magnetic tape cartridge is used, the magnetic tape is pulled out and is introduced into a recording/reproducing device, and thereby data or the like is recorded and replayed. A drawing member is provided at the starting end of the magnetic tape in order that the recording/reproducing device pulls out the magnetic tape from the cartridge case. As this drawing member, a leader block, a leader pin and a leader tape have been known.

The leader block and the leader pin are attached to the magnetic tape or the leader tape made of the magnetic tape, and are loaded in a storing recessed part provided in a take-up reel hub in the tape drive of the recording/reproducing device. However, in this storing recessed part, level difference with the take-up reel hub is easily generated, and an influence applied to the magnetic tape by the level difference poses a problem.

On the other hand, when only the leader tape is joined to the starting end of the magnetic tape, the leader tape must have a certain level of rigidity, so-called "stiffness" so as to correspond to tension force added at the time of drawing the magnetic tape. The buckle member of the side of the drive of the recording/reproducing device hook hooks the leader tape having "stiffness," and the magnetic tape is taken up on the take-up reel in the drive. Since this leader tape requires "stiffness," the base part thereof has a certain level of thickness (150 µm to 200 µm), and level difference is formed at a joining part of the magnetic tape having a thickness of about 4 µm to about 12 µm thinner than that of the base part and the leader tape. Then, so as to reduce the level difference, a method for forming a gradual reducing part of which the thickness is gradually reduced in a tapered shape toward the joining part by machining, has been known (see Japanese Published Unexamined Patent Application No. 2000-11591, and Japanese Published Unexamined Patent Application No. 2000-113435). However, when the gradual reducing part is formed by machining, the adhesiveness with a splicing tape used for joining poses a problem depending on the surface properties of the processing surface, and the joining of the leader tape and magnetic tape cannot be reliably strengthened.

The leader tape is conventionally made of a material consisting primarily of PET or PET. While the leader tape has high tensile strength, the leader tape is easily charged, and thereby there is a concern that electrostatic friction occurs between the leader tape and an MR head used for high-density recording. Therefore, a method for coating or coating carbon black on the surface has been proposed (see Japanese published examined application No. S62-15945, and Japanese Published Unexamined Patent Application No. H5-314452).

However, since the magnetic tape slides on a head or a guide part at high speed in a high capacity/highly accurate drive of a data backup used in recent years, and data is read out and written simultaneously and repeatedly, the slight generation of abrasion powder causes an error, and may become one of the causes of serious trouble. Therefore, Japanese Published Examined Utility Model Application No. S49-42726 has proposed a method for irregularly forming the surface of the leader tape and cleaning the head and the guide part due to the irregularity. However, the cleaning effect of the leader tape is not permanent, and rather the probability that the abrasion of the leader tape causes an error is high. A leader tape obtained by using a film consisting of resin containing the carbon black as the base material of the leader tape, roughing the surface of the base material using sandblast, and applying or coating a conductive agent has been known. However, the adhesion of the conductive agent is worsened, and it has also been understood that the exfoliated conductive agent causes a dropout.

It is an object of the present invention to provide a leader tape having surface properties and conductive properties for securing slide durability suitable for a magnetic tape drive using a magnetic tape cartridge of one reel cartridge.

SUMMARY OF THE INVENTION

So as to solve the problems above, a leader tape of the present invention, joined to a starting end of a magnetic tape wound around a magnetic tape reel of a one reel cartridge, comprising: a base material; and a conductive slide layer formed on at least one surface of the base material, the surface of the conductive slide layer having a surface electrical resistance value of $10^2$ Ω/square to $10^{10}$ Ω/square and a surface roughness Ra of 0.5 µm to 1.5 µm.

The conductive slide layer formed on at least one surface of the base material of the leader tape has a surface having the surface electrical resistance value of $10^2$ Ω/square to $10^{10}$ Ω/square, and the surface roughness Ra of 0.5 µm to 1.5 µm, and thereby the leader tape can acquire slide durability and conductive properties suitable for the magnetic tape drive.

The leader tape of the present invention has a join end part joined to the starting end of the magnetic tape having a thickness of 4 µm to 12 µm; the join end part has a gradual reducing face formed so that the thickness is gradually reduced toward the tip on at least one surface; and the thickness of the tip is 15 µm to 50 µm.

The join end part of the leader tape has a gradual reducing face formed so that the thickness is gradually reduced toward the tip on at least one surface, and the thickness of the tip is 15 µm to 50 µm. Thereby, level difference is reduced as much as possible in a joining part with the starting end of the magnetic tape having the thickness of 4 µm to 12 µm, and the joining of the leader tape and magnetic tape can be reliably strengthened.

The present invention provides a method for manufacturing the leader tape wherein the gradual reducing face is formed after forming the conductive slide layer on the base material.

According to this method for manufacturing, an extremely smooth gradual reducing face can be formed by forming the gradual reducing face after forming the conductive slide layer on the base material.

Furthermore, the present invention provides a magnetic tape cartridge comprising a reel wound by a magnetic tape having a starting end to which the leader tape is joined, wherein the reel is made of a material in which a hub has at least a surface electrical resistance value of $10^5$ Ω/square to $10^{12}$ Ω/square, and is electrically connected to the magnetic tape.

In this magnetic tape cartridge, the reel is made of the material in which the hub has at least the surface electrical resistance value of $10^5$ Ω/square to $10^{12}$ Ω/square, and is electrically connected to the magnetic tape. Thereby, accumulation of static electricity is prevented, and a reduction in the problem in the tape drive device using the MR head weak to electrostatic discharge can be attained.

DETAILED DESCRIPTION OF THE PREFERRED EMBODIMENT

Figure 1:
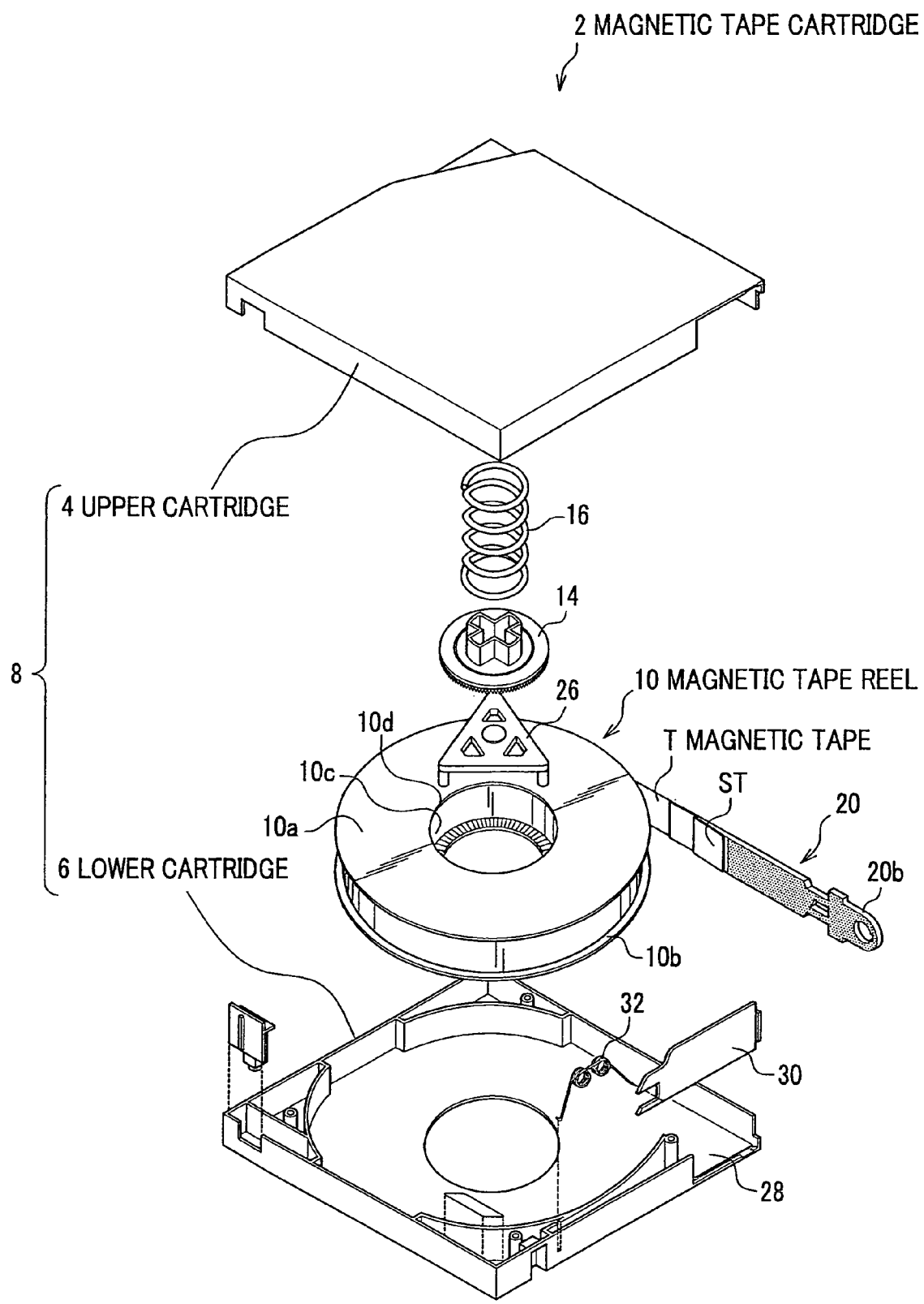
FIG. 1 is an exploded perspective view of a magnetic tape cartridge according to the embodiment of the present invention.

Next, the embodiment of the present invention will be explained in detail with reference to the drawings. FIG. 1 is an exploded perspective view of a magnetic tape cartridge of one reel cartridge according to the embodiment of the present invention.

A magnetic tape cartridge 2 shown in FIG. 1 is provided with a cartridge case 8 consisting of an upper cartridge 4 and a lower cartridge 6, and a magnetic tape reel 10 rotatably stored in the cartridge case 8.

Figure 2:
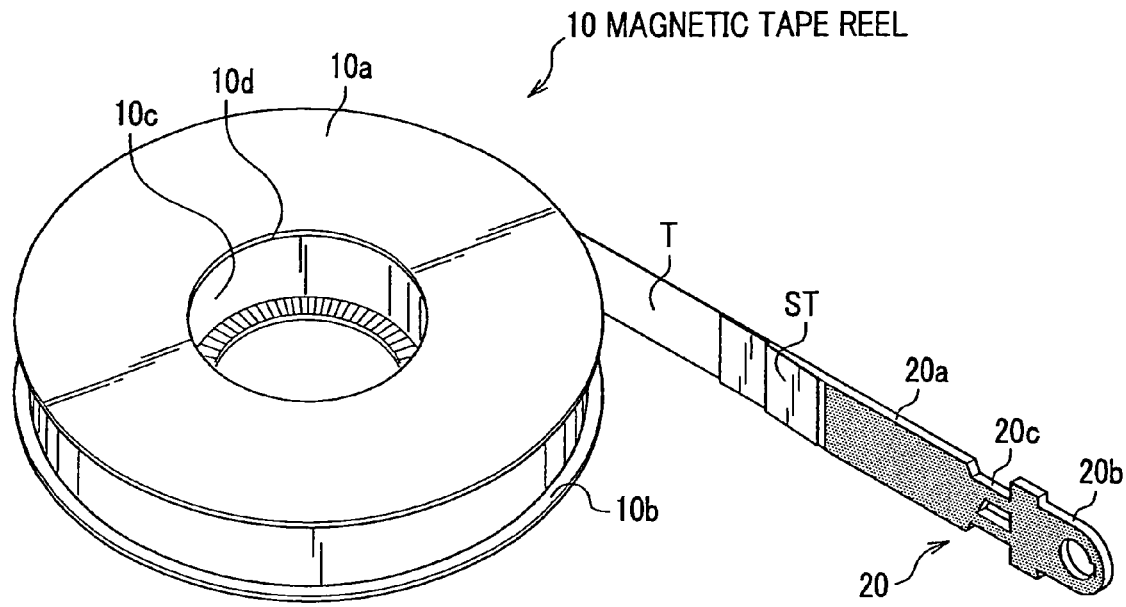
FIG. 2 is a perspective view of a magnetic tape reel according to the embodiment of the present invention.

As shown in FIG. 2, the magnetic tape reel 10 is provided with an upper flange 10a provided on the upper surface, a lower flange 10b provided on the lower surface, and a hub 10c connecting the upper flange 10a with the lower flange 10b and wound by a magnetic tape T.

As shown in FIG. 1, a gear 10d is formed on the inner periphery of the lower flange 10b of the magnetic tape reel 10, and a recess part is formed in the central part of the upper flange 10a. A reel lock 14 for keeping the magnetic tape reel 10 in a lock state so that the magnetic tape reel 10 is not rotated except when the magnetic tape cartridge 2 is charged into a tape drive device, and a release pad 26 for releasing the lock state of the magnetic tape reel 10 are arranged in the recess part. The reel lock 14 is pressed downward of the magnetic tape reel 10 by a compression coil spring 16 disposed above the reel lock 14.

The magnetic tape reel 10 thus constituted is stored in the cartridge case 8 in which the upper cartridge 4 and the lower cartridge 6 are assembled as one with a screw. The magnetic tape reel 10 is pressed toward the lower cartridge 6 by the compression coil spring 16 in the assembled cartridge case 8, and the magnetic tape reel 10 is rotatably supported in the cartridge case 8.

When the magnetic tape cartridge 2 is not used, the magnetic tape T is completely taken up on the magnetic tape reel 10, and the tip 20b of a leader tape 20 joined to the outermost end part (starting end) of the magnetic tape T is engaged with the side surface of the cartridge case 8.

The magnetic tape reel 10 incorporated into the cartridge case 8 is locked so that the rotation of the magnetic tape reel 10 causes no slackening of the magnetic tape T when the magnetic tape cartridge 2 is not used by engaging a claw part provided on the bottom circumference of the reel lock 14 energized toward the gear 10d of the lower flange 10b by a torsion coil spring 16 with the gear 10d of the lower flange 10b. An openable/closable lid 30 is energized and attached to an opening part 28 for pulling out the magnetic tape T in the direction where the lid 30 is closed by a torsion coil spring 32.

On the other hand, when the magnetic tape cartridge 2 is used, the lock due to the reel lock 14 is released by the release pad 26 driven by a recording/reproducing device provided on a computer or the like. The leader tape 20 and the magnetic tape T following the leader tape 20 are pulled out by an engaging means with the leader tape 20, and thereby recording and reproduction are made possible.

Figure 3:
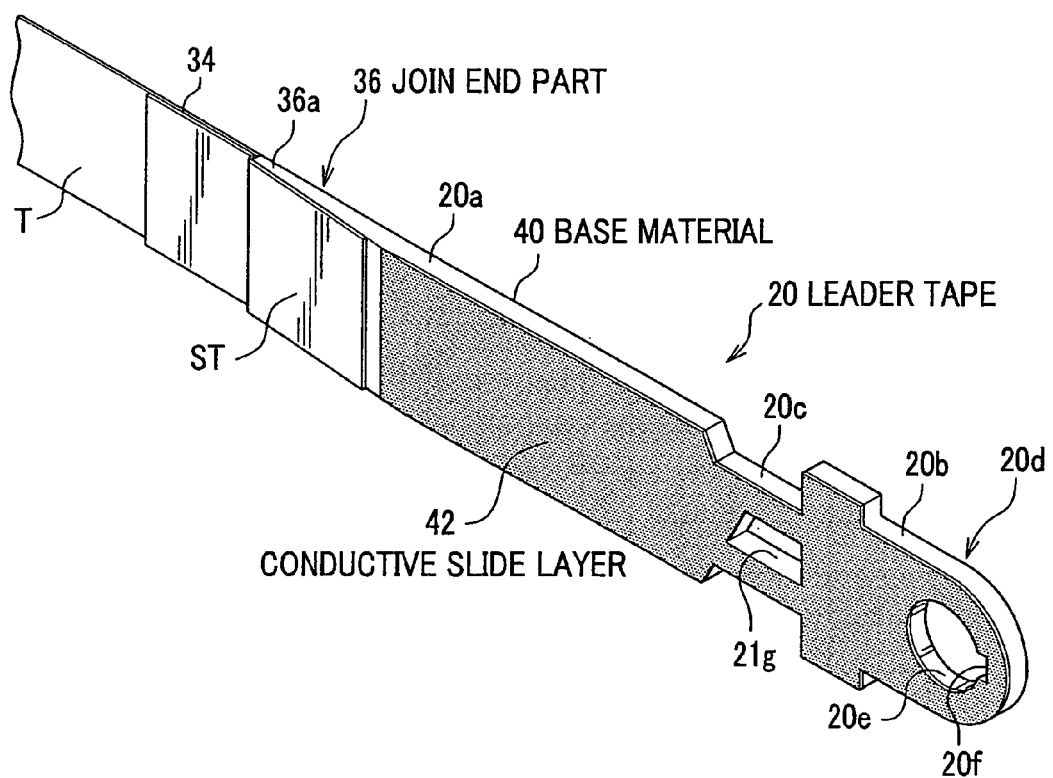
FIG. 3 is a perspective view of a leader tape according to the embodiment of the present invention.

As shown in FIG. 3, the leader tape 20 is composed by a base part 20a, a generally semicircular plate-shaped tip 20b, and a connecting part 20c for connecting the base part 20a with the tip 20b.

An engagement part 20d engaged with the buckle member 21 with which a tape drive of the recording/reproducing device is provided is formed in the tip 20b. The engagement part 20d has a through-hole 20e bored in the generally semicircular plate-shaped tip 20b, and an engagement groove 20f communicated with the through-hole 20e and projectedly provided toward the top part of the tip 20b.

Figure 4A:
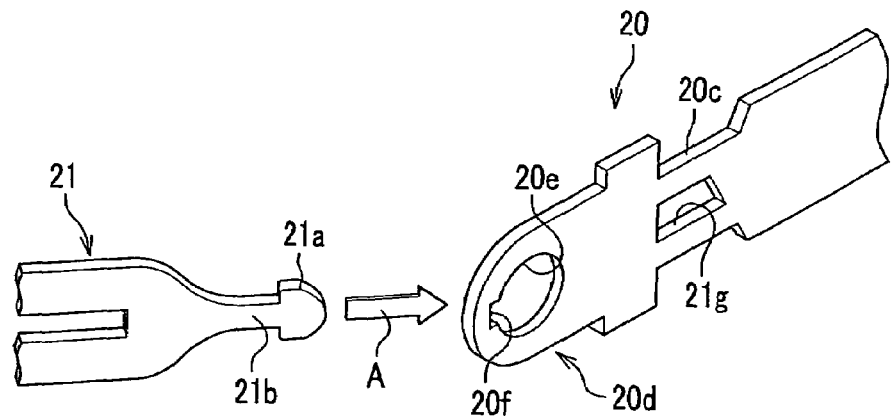
FIGS. 4A to 4C are diagrams for explaining the engagement of the leader tape and buckle member of a tape drive in order.
Figure 4B:
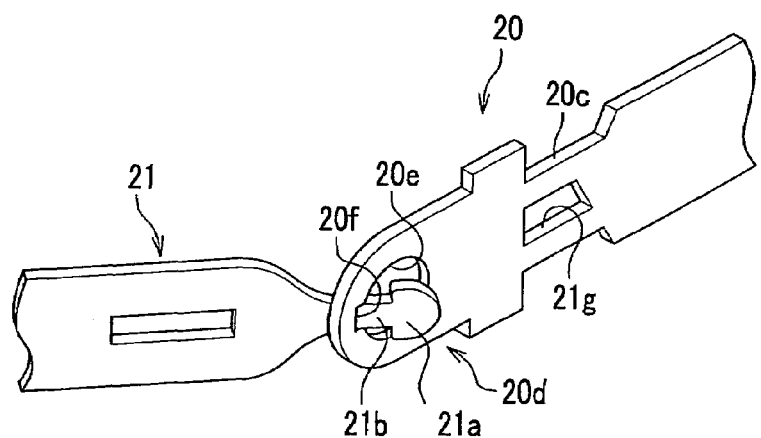
Figure 4C:
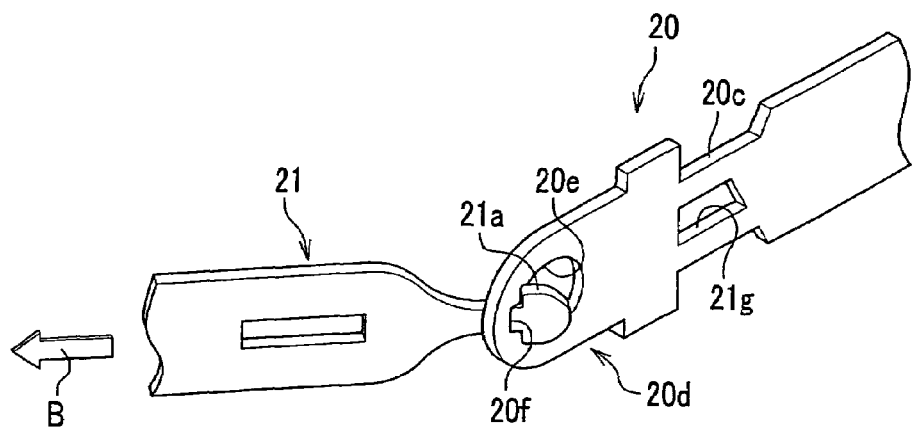

As shown in FIG. 4A, referring to the engagement of the engagement part 20d and buckle member with which the tape drive is provided, an anchor-shaped engagement end 21a formed in the tip of the buckle member 21 is projected toward an arrow mark A, and is inserted into the through-hole 20e of the engagement part 20d. Next, as shown in FIG. 4B, a neck part 21b of the engagement end 21a of the buckle member 21 is passed through the engagement groove 20f, and as shown in FIG. 4C, the anchor-shaped engagement end 21a is then engaged with the engagement groove 20f by pulling the buckle member 21 toward an arrow mark B. Therefore, the magnetic tape T (refer to FIG. 1 and FIG. 2) joined to the leader tape 20 can be taken up by driving a take-up reel provided in the tape drive of the recording/reproducing device.

A generally rectangular locking hole 21g engaged with a hook assembled on the side surface of the cartridge case 8 is bored in the connecting part 20c.

Figure 5A:
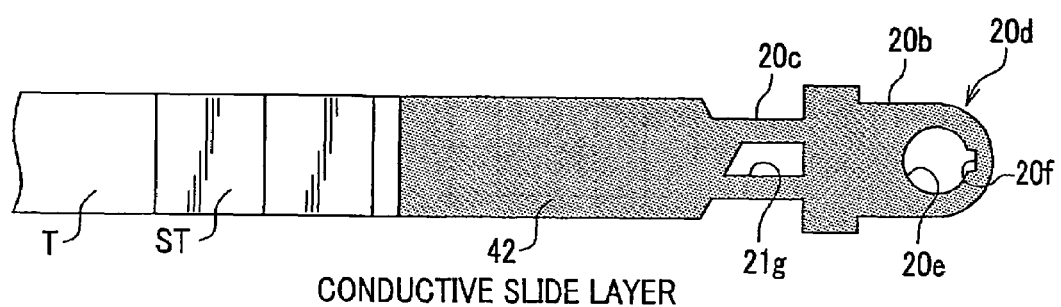
FIG. 5A is a plan view showing a state where the leader tape is joined to the starting end of the magnetic tape.
Figure 5B:
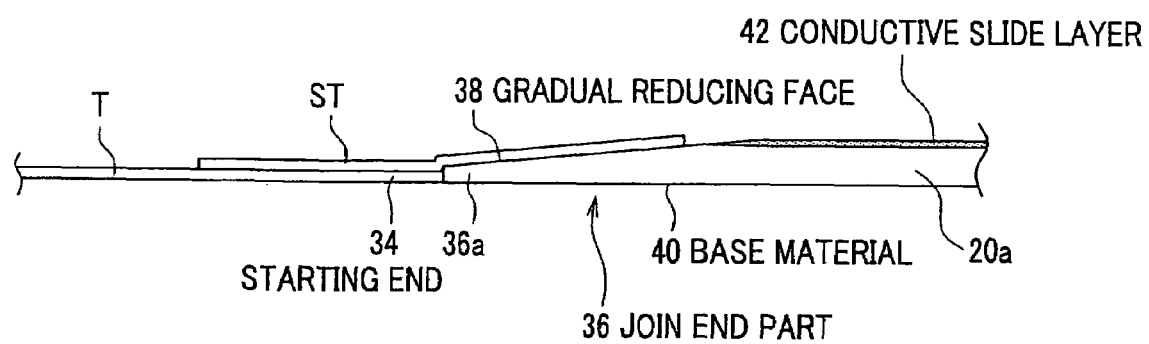
FIG. 5B is a side view of the state.

As shown in FIG. 3, FIGS. 5A and 5B, the base part 20a has a join end part 36 having a tip 36a joined to the starting end 34 of the magnetic tape T. The join end part 36 has a gradual reducing face 38 formed so that the thickness is gradually reduced toward the tip 36a. The thickness of the tip 36a is preferably 15 µm to 50 µm so as to reduce the level difference in the joining part between the tip 36a and the starting end 34 of the magnetic tape having the thickness of 4 µm to 12 µm as much as possible and to reliably strengthen the joining of the leader tape and magnetic tape.

The join end part 36 is preferably as long as possible in view of preventing stress from concentrating on the tape at the time of winding the tape by the rapid change in the thickness. However, it is preferable that the length of the join end part 36 is 5 mm to 55 mm in consideration of preferably preventing the join end part 36 from becoming too long in view of the productivity. It is preferable that the surface roughness of the gradual reducing face 38 is as small as possible in view of the attaching intensity of a splicing tape. However, it is preferable that the surface roughness Rz is 0.8 µm to 3 µm, and particularly preferably about 1.2 µm in consideration of productivity such as shortening of machining time.

The tip 36a of the join end part 36 and the starting end 34 of the magnetic tape T are placed against each other, and the magnetic tape T and the leader tape 20 are joined by adhering a splicing tape ST so as to cover the gradual reducing face 38 and the surface of the starting end 34. At this time, the large level difference generated in the joining part of the magnetic tape T and leader tape 20 can be reduced by the gradual reducing face 38. Therefore, degradation of the electromagnetic characteristic of the magnetic tape T caused by the level difference is prevented, stable smooth travel can be performed at the time of drawing the magnetic tape T by the leader tape 20 or storing the magnetic tape T in the cartridge case 8.

The splicing tape ST may have at least one surface conductively treated. Particularly, the splicing tape ST on which an aluminum is deposited is preferable. Thereby, when the magnetic tape T cannot be joined to the leader tape 20 satisfactorily, and a gap exists, the conductive splicing tape ST plays the role of a conductive path between the leader tape 20 and the magnetic tape T.

As shown in FIG. 3 and FIG. 5B, this leader tape 20 has a base material 40 and a conductive slide layer 42 formed on one surface of the base material 40.

The base material 40 is made of a material such as polyethylene terephthalate (PET) and polyethylenenaphthalate (PEN).

When the thickness of the base material 40 is too thick, a spring back force (a force returning to linearly-zonal shape after winding) at the time of winding the magnetic tape reel 10 becomes strong. When the thickness of the base material 40 is too thin, the strength is insufficient. Thereby, the thickness is preferably 50 µm to 200 µm, and particularly preferably about 188 µm.

The conductive slide layer 42 comprises a thermosetting resin as a matrix, and is formed by applying or coating a coating liquid in which carbon black for improving slidability and conductivity is blended with the thermosetting resin. The content of the carbon black in the conductive slide layer 42 is preferably 15 mass % to 35 mass %, and more preferably 15 mass % to 25 mass % in view of preventing the exfoliation of the conductive slide layer 42 due to friction of the surface of the leader tape and buckle member 21 at the time of being engaged with the buckle member 21, reducing the surface electrical resistance value, and improving the adhesion with the matrix thermosetting resin, and dispersibility. As the thermosetting resin, for example, a phenol resin, an epoxy resin, a polyurethane curable resin, a urea resin, a melamine resin, an alkyd resin, an acrylic reaction resin, a formaldehyde resin, a silicone resin, an epoxy-polyamide resin and polyisocyanate or the like can be used. After this thermosetting resin is heated, and is fixedly stuck to the base material 40, the thermosetting resin is formed into a sheet shape through a process for eliminating distortions.

It is preferable that the conductive slide layer 42 contains a lubricant as the purpose for improvement in slidability. Hydrocarbon lubricants (polyethylene, paraffin and wax), aliphatic lubricants (stearic acid), aliphatic amide lubricants (stearic acid amide), ester lubricants (butyl stearate), alcoholic lubricants, metallic soaps, solid lubricants (molybdenum disulfide), silicon resin particles, fluorocarbon resin particles, crosslinked polymethyl methacrylate particles and crosslinked polystyrene particles or the like can be used alone or in combination thereof as the lubricant.

The surface electrical resistance value of the conductive slide layer 42 is $10^2$ Ω/square to $10^{10}$ Ω/, preferably $10^2$ Ω/square to $10^6$ Ω/square, and particularly preferably $10^3$ Ω/square to $10^5$ Ω/square. Although the surface electrical resistance value of the conductive slide layer 42 may be less than $10^2$ Ω/square, the cost becomes high since the surface electrical resistance value is made to be less than $10^2$ Ω/square. When the surface electrical resistance value exceeds $10^{10}$ Ω/square, an effect for preventing electrostatic discharge is small.

In view of reducing the contact area of the conductive slide layer 42 with a sliding member of the side of the tape drive to improve the slide durability, the surface roughness Ra of the conductive slide layer 42 is 0.5 µm to 1.5 µm, and preferably about Ra 0.7 µm. The increase in cost is caused by smoothing processing so as to form the conductive slide layer 42 of which the surface roughness Ra is less than 0.5 µm. Also, the coefficient of dynamic friction becomes large, and the leader tape may be stuck to a guide roller of the tape drive device. On the other hand, when the surface roughness Ra exceeds 1.5 µm, the abrasion of the head may be caused. Ra (central line average surface roughness) showing the surface roughness in the present invention is a value measured for a medium surface having a surface area of about 250 µ×250 µ by an optical interference method using TOPO-3D, manufactured by WYKO company. At this time, the wavelength of measuring light is about 650 nm, and spherical correcting and cylindrical correcting are added. It is preferable that the coefficient of dynamic friction of the surface of the conductive slide layer 42 is 0.15 to 0.35 in consideration of the cost required for the smoothing processing, stiction of the leader tape to a guide roller, and abrasion of the head. The coarseness of both sides may be changed in the range having no influence in slide durability at the time of forming the conductive slide layer 42 on both surfaces of the base material 40.

The thickness of the conductive slide layer 42 is preferably 7 µm to 18 µm, and more preferably 7 µm to 14 µm, and particularly preferably about 9 µm in view of the adhesion of the base material 40 with the conductive slide layer 42, and the slide durability of the base material 40 with the sliding member such as the head and the guide. When the conductive slide layer 42 is formed on both surfaces of the base material 40, the thickness of the conductive slide layer formed on one surface may not be the same as that of the conductive slide layer formed on the other surface. The thickness of the conductive slide layer formed on one surface may be different from the thickness of the other conductive slide layer in consideration of the surface which slides on the head. For example, the thickness of the conductive slide layer of the surface which slides on the head can be set to 9 µm, and the thickness of the conductive slide layer of the other surface can be set to 7 µm. Since the conductive slide layer 42 may be exfoliated by friction with the buckle member 21, the conductive slide layer 42 may not be formed on the base material 40 near the engagement part 20d with the buckle member 21 of the tape drive at the time of being engaged with the buckle member 21.

Static electricity discharge to an MR head promoted and adopted in recent years can be suppressed by incorporating the leader tape 20 into the tape cartridge driven by the tape drive device using the MR head weak in static electricity discharge. Particularly, the leader tape 20 of the present invention is effectively applied to the magnetic tape for the tape drive device provided with an electromagnetic induction head for recording and an MR head for replaying. Examples of the MR heads include an AMR head and GMR head utilizing a magneto-resistance effect. Particularly, the MR head is effective in the tape drive device utilizing the GMR head weak in static electricity discharge. A drive on which a plurality of MR heads are mounted is sensitive to static electricity discharge so as to improve the replaying rate of data. However, the leader tape of the present invention is also effective in such a case.

The method for manufacturing the leader tape 20 is not particularly limited as long as the method can form the conductive slide layer 42 on the surface of the base material 409 and form the gradual reducing face 38 on a join end part 36. Particularly, when the conductive slide layer 42 formed on the surface of the base material 40 is also cut by machining, the method has merit that the gradual reducing face 38 can be extremely smoothly formed, and the cost is also lowered. Thereby, the gradual reducing face 38 is preferably formed after forming the conductive slide layer 42 on the base material 40. For example, it is preferable to attach a masking material to a part corresponding to the gradual reducing face 38 of the base material 40, form the conductive slide layer 42 on at least one surface of the base material 40, remove the masking material, and then form the gradual reducing face 38. Since the gradual reducing face 38 can be correctly formed regardless of the thickness of the conductive slide layer 42 until the thickness of gradual reducing face 38 is reduced to a predetermined thickness in a short period of time at this time, the gradual reducing face 38 is preferably formed by machining. Therefore, a masking process may be a rough masking which does not require positioning, and is effective in reduction of cost. When the tip of the base material 40 is machined after forming the conductive slide layer 42 on the base material 40, and the cut part of the base material 40 and the conductive slide layer formed on the cut part are simultaneously removed, the gradual reducing face 38 can be formed without performing processes such as masking, and the time and cost required for masking can be reduced, thereby being advantageous in terms of cost.

It is preferable that at least the hub 10c (refer to FIG. 2) of the magnetic tape reel 10 with which the magnetic tape cartridge 2 is provided is made of a material of which the surface electrical resistance value is $10^5$ Ω/square to $10^{12}$ Ω/square, and the magnetic tape reel 10 is electrically connected to the magnetic tape T. Thereby, the accumulation of static electricity is prevented, and reduction in the problem of the tape drive device using the MR head weak in electrostatic discharge can be attained. The magnetic tape T is electrically connected to the magnetic tape reel 10 by directly adhering the end face of the magnetic tape T having conductive properties to the surface of the hub 10c of the magnetic tape reel 10, or by adhering the end face to the surface of the hub 10c using pure water or alcohol.

It is preferable that the magnetic tape reel 10 is made of a synthetic resin containing a conductive material, and examples of the conductive materials include a carbon fiber. When the magnetic tape reel 10 contains the carbon fiber, it is preferable that the content is 5 mass % to 10 mass %. Examples of synthetic resins constituting the magnetic tape reel 10 include polycarbonate (PC), an ABS resin, and a mixed resin of the polycarbonate (PC) and ABS resin.

As described above, although the leader tape and magnetic tape cartridge of the present invention are explained in detail based on the embodiment shown in FIG. 1 to FIG. 6, the present invention is not limited to the embodiment, and various kinds of modes are possible. For example, although the embodiment explains the leader tape 20 having the engagement part 20d in the tip 20b, the leader tape 20 may have the leader pin or the leader block instead of the engagement part 20d.

The leader tape of the present invention is applied to the magnetic tape cartridge of one reel cartridge, and has the surface properties and conductive properties for securing slide durability suitable for the magnetic tape drive using the magnetic tape cartridge.

According to the method for manufacturing the leader tape of the present invention, the gradual reducing face can be very smoothly formed and moreover, the processing cost is also low.

The magnetic tape cartridge provided with the magnetic tape of which the tape end is joined to the leader tape of the present invention prevents the accumulation of static electricity, and can attain a reduction in the problem in the tape drive device using the MR head weak to electrostatic discharge.

What is claimed is:

1. A leader tape joined to a starting end of a magnetic tape wound around a magnetic tape reel of a one reel cartridge, comprising:
   a base material; and
   a conductive slide layer formed on at least one surface of the base material,
   the surface of the conductive slide layer having a surface electrical resistance value of $10^2$ Ω/square to $10^{10}$ Ω/square and a surface roughness Ra of 0.5 µm to 1.5 µm.

2. The leader tape according to claim 1, wherein the base material has a thickness of 50 µm to 200 µm, and the conductive slide layer has a thickness of 7 µm to 18 µm.

3. A magnetic tape cartridge comprising a magnetic tape reel wound by a magnetic tape having a starting end to which the leader tape according to claim 2 is joined, wherein
   the reel is made of the material in which a drum part has at least a surface electrical resistance value of $10^5$ Ω/square to $10^{12}$ Ω/square, and is electrically connected to the magnetic tape.

4. The magnetic tape cartridge according to claim 3, wherein the reel is made of a synthetic resin containing a conductive material.

5. The magnetic tape cartridge according to claim 4, wherein the content of the carbon fiber is 5 mass % to 10 mass %.

6. The leader tape according to claim 1, wherein the conductive slide layer contains carbon black of 15 mass % to 35 mass %.

7. The leader tape according to claim 1, wherein the conductive slide layer contains a lubricant.

8. The leader tape according to claim 1, wherein the coefficient of dynamic friction of the surface of the conductive slide layer is 0.15 to 0.35.

9. The leader tape according to claim 1, wherein the leader tape is incorporated into a tape cartridge driven by a tape drive device using an MR head.

10. The leader tape according to claim 1, wherein the leader tape has a join end part joined to the starting end of the magnetic tape having a thickness of 4 µm to 12 µm; the join end part has a gradual reducing face formed so that the thickness is gradually reduced toward the tip on at least one surface; and the thickness of the tip is 15 µm to 50 µm.

11. The leader tape according to claim 10, wherein the join end part has a length of 5 mm to 55 mm; the gradual reducing face has a surface roughness Rz of 0.8 µm to 3 µm; and the join end part is attached to the magnetic tape by a splicing tape adhered to the gradual reducing face.

12. A method for manufacturing the leader tape according to claim 10, wherein the gradual reducing face is formed after forming the conductive slide layer on the base material.

13. The method for manufacturing the leader tape according to claim 12, wherein the gradual reducing face is formed by machining.

14. A method for manufacturing the leader tape according to claim 10, wherein the gradual reducing face is formed after forming the conductive slide layer on at least one surface of the base material attaching a masking material to a part corresponding to the gradual reducing part of the base material and then after removing the masking material.

15. A magnetic tape cartridge comprising a magnetic tape reel wound by a magnetic tape having a starting end to which the leader tape according to claim 10 is joined, wherein
the reel is made of the material in which a drum part has at least a surface electrical resistance value of $10^5$ Ω/square to $10^{12}$ Ω/square, and is electrically connected to the magnetic tape.

16. The magnetic tape cartridge according to claim 15, wherein the reel is made of a synthetic resin containing a conductive material.

17. A magnetic tape cartridge comprising a magnetic tape reel wound by a magnetic tape having a starting end to which the leader tape according to claim 1 is joined, wherein
the reel is made of the material in which a drum part has at least a surface electrical resistance value of $10^5$ Ω/square to $10^{12}$ Ω/square, and is electrically connected to the magnetic tape.

18. The magnetic tape cartridge according to claim 17, wherein the reel is made of a synthetic resin containing a conductive material.

19. The magnetic tape cartridge according to claim 18, wherein the conductive material is a carbon fiber.

* * * * *